United States Patent [19]

Burshtein et al.

[11] Patent Number: 5,771,374

[45] Date of Patent: Jun. 23, 1998

[54] EVENT DRIVEN PROGRAMMER LOGIC CONTROLLER PROCESSOR ARRANGEMENT WITH BUFFERED INPUTS AND METHOD OF OPERATION OF THE SAME

[75] Inventors: Anat Burshtein, Tel Aviv; Shlomo Scop, Netanya; Haim Geller, Modi'in, all of Israel

[73] Assignee: Motorola, Inc., Schaumburg, Ill.

[21] Appl. No.: 514,548

[22] Filed: Aug. 14, 1995

[30] Foreign Application Priority Data

Aug. 16, 1994 [IL] Israel .................................. 9416516.4

[51] Int. Cl.[6] .................................................. G06F 19/00
[52] U.S. Cl. ........................ 395/557; 364/140; 364/579; 395/250; 395/736
[58] Field of Search .................................. 364/140, 579; 395/250, 736, 739, 557

[56] References Cited

U.S. PATENT DOCUMENTS

| | | | |
|---|---|---|---|
| 4,941,081 | 7/1990 | Kumar et al. ........................... | 364/140 |
| 4,975,865 | 12/1990 | Carnette et al. ......................... | 364/573 |
| 5,072,356 | 12/1991 | Watt et al. .............................. | 364/140 |
| 5,325,522 | 6/1994 | Vaughn ..................................... | 707/1 |
| 5,426,774 | 6/1995 | Banerjee et al. .................... | 395/182.14 |

Primary Examiner—Kenneth S. Kim
Attorney, Agent, or Firm—M. Mansour Ghomeshi

[57] ABSTRACT

A processor arrangement is described having a programmer logic controller (PLC) operating to a ladder diagram process. A number of event inputs (11–15) are provided connected to an interrupt buffer (31), in turn connected to a real time clock (32), for recording times of events of signals received on the event inputs and generating interrupts. Sequential storage locations in a cyclical buffer (60) store interrupts and their event times, where events occurring within a predetermined incremental time window are stored, with their event times, in a storage location for that time window. Each location of the cyclical buffer is inspected in sequence upon each new step of the sequential process. The PLC is arranged to operate on any events stored in the buffer which are affected by the new step of the sequential process before proceeding to the next step of the sequential process.

7 Claims, 3 Drawing Sheets

EVENT DRIVEN PROGRAMMER LOGIC CONTROLLER PROCESSOR ARRANGEMENT WITH BUFFERED INPUTS AND METHOD OF OPERATION OF THE SAME

FIELD OF THE INVENTION

This invention relates to a processor arrangement having a programmer logic controller operating to a ladder diagram process, that is to say a process that is programmed according to a sequential series of instructions or operations, such as instructions involving initiating of timers upon the occurrence of events.

BACKGROUND TO THE INVENTION

International standard 1131-3 of the International Electrotechnical Commission "Programming Controllers Part 3: Programming Languages" 1993 describes programming languages for programmable controllers and describes certain graphic languages. Pages 257, 259, 261 and 263(alternate pages) describe a ladder diagram language for ladder diagram programming of programmable controllers. A ladder diagram program enables a programmable controller to test and modify data by means of standardized graphic symbols. These symbols are laid out in networks in a manner similar to a "rung" of a relay ladder logic diagram.

Programmer logic controllers are highly suitable for use in applications such as supervisory control an acquisition of data (SCADA). An example of SCADA equipment using a programmer logic controller is MOSCAD equipment of Motorola Israel Limited and Motorola Inc.

Programmer logic controllers (PLCs) are driven by sequential programs, i.e. all inputs have to be scanned in order to find whether any of the inputs has changed. After all inputs have been scanned, the process takes place in order to deal with the changes according to the ladder diagram program language. Such controllers have the advantage of requiring simple logical programming and are very suitable for alarm and control applications.

A problem in a sequential system is that if the inputs are changing in a faster rate then the scan time, the PLC will miss the changes. Common programmable logic controllers cannot detect a series of discrete inputs' values that have existed less then the scan time. Furthermore, this time interval between two readings of an input is depended on the scan time which is depended on the controller occupancy. Existing solutions to the problem require special input modules with special firmware in order to detect these fast changes.

Additionally, it is a common problem in a PLC's world that if a short delay (shorter then the scan time) should be required to take place from an input change, the PLC will start the delay from the time that it senses the change by the program and not from the time that the input change really occurred, so a delayed status might be treated out of sequence by the process.

There is a need for a processor having the advantages of a PLC and the ability to receive and deal with fast changes of discrete inputs, and having the means for dealing with short delays in a process by a PLC that works with sequential mechanism.

SUMMARY OF THE INVENTION

According to the present invention, a processor is provided comprising a programmer logic controller operating to a ladder diagram process comprising a sequence of instructional steps. A number of event inputs are provided, connected to an interrupt buffer, in turn connected to a real time clock, for recording times of events of signals received on the event inputs and generating interrupts, a cyclical buffer comprising sequential storage locations for storing interrupts and their event times, where events occurring within a predetermined incremental time window are stored, with their event times, in a storage location for that time window. Event retrieval means are provided for inspecting each location of the cyclical buffer in sequence upon each new step of the sequential process, wherein the programmer logic controller is arranged to operate on any events stored in the buffer which are affected by the new step of the sequential process before proceeding to the next step of the sequential process.

The invention has the advantage of enabling a series of inputs to be detected that have existed for as little as a few milliseconds (just enough to pass the input filter of the hardware). The detection of the inputs' changes is not affected by the controller occupancy nor by it's scan time, and a regular input module of a PLC can be used. This resolution is very high and cannot be achieved by any known programmable controller that is not using dedicated input module for the fast inputs.

The cyclical buffer is preferably formed in normal RAM memory associated with the processor or programmer logic controller, being the same memory as is used for other tasks.

The invention has the advantage that standard input/output modules can be used and no special additional hardware is necessary.

In accordance with another aspect of the invention, a method of operation of a programmer logic controller operating to a ladder diagram process is provided comprising a sequence of instructions, including instructions involving initiating of timers upon the occurrence of events. The method comprises the steps of receiving event signals at event inputs on the occurrence of events, recording times of the event signals received on the event inputs and generating interrupts on the occurrence of the events, storing in a cyclical buffer comprising sequential storage locations, interrupts and their event times, where events occurring within a predetermined incremental time window are stored, with their event times, in a storage location for that time window, inspecting each location of the cyclical buffer in sequence upon each new step of the sequential process, and operating on any events stored in the buffer which are affected by the new step of the sequential process before proceeding to the next step of the sequential process.

The step of operating preferably comprises inserting an indicator into the cyclical buffer in a new location determined by the step and the event, for running a logical equation at a time corresponding to the new location in the buffer.

The step of inserting may comprise measuring a delay time predetermined by the step in the sequential process and selecting a location in the buffer offset from the storage location corresponding to the predetermined incremental time window by a number of buffer locations corresponding to the delay time.

DETAILED DESCRIPTION OF THE PREFERRED EMBODIMENT

Figure 1:
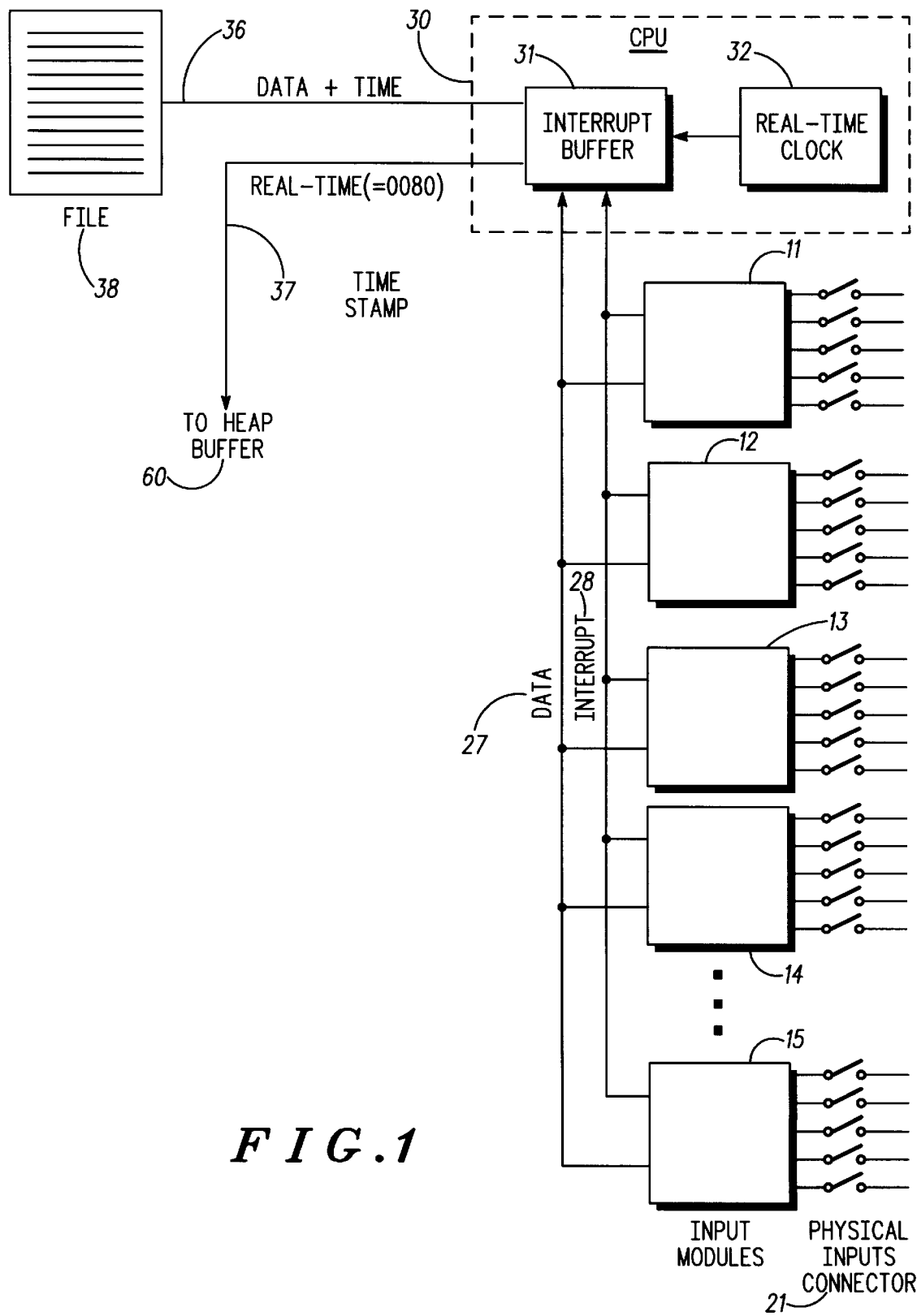
FIG. 1 shows an overall circuit diagram of a processor in accordance with the invention.

Referring to FIG. 1, the hardware required for the preferred embodiment of the invention comprises, as a minimum, a number of input modules 11 to 15, a central processing unit (CPU) module 30 comprising, among other components, a real-time clock 32 and an interrupt buffer 31. A data line 27 and an interrupt line 28 are connected between the input modules and the CPU module 30. Physical input connectors 21 are connected to the input modules 11 to 15. The physical inputs can change their status from open to close.

Also shown in FIG. 1 are a data and time output 36 leading from the interrupt buffer 31 to a data file 38 and a real-time output 37 leading from the interrupt buffer 31 to a heap buffer 60, not shown on FIG. 1. These elements 36, 37, 38 and 60 are in fact software elements in the CPU 30.

In operation, a change of status of any one of the inputs 21 is detected by the associated input module 11 to 15, which sends an interrupt to the processor 30 on the interrupt line 28 and sends the data of the change (the input module number and the input number) on the data line 27. This information is written into the interrupt buffer 31 in the CPU 30, together with the accurate real-time (1 millisecond resolution) from the real-time clock 32. The information from the interrupt buffer is stored in a time tag file 38 for later retrieval.

Figure 2:
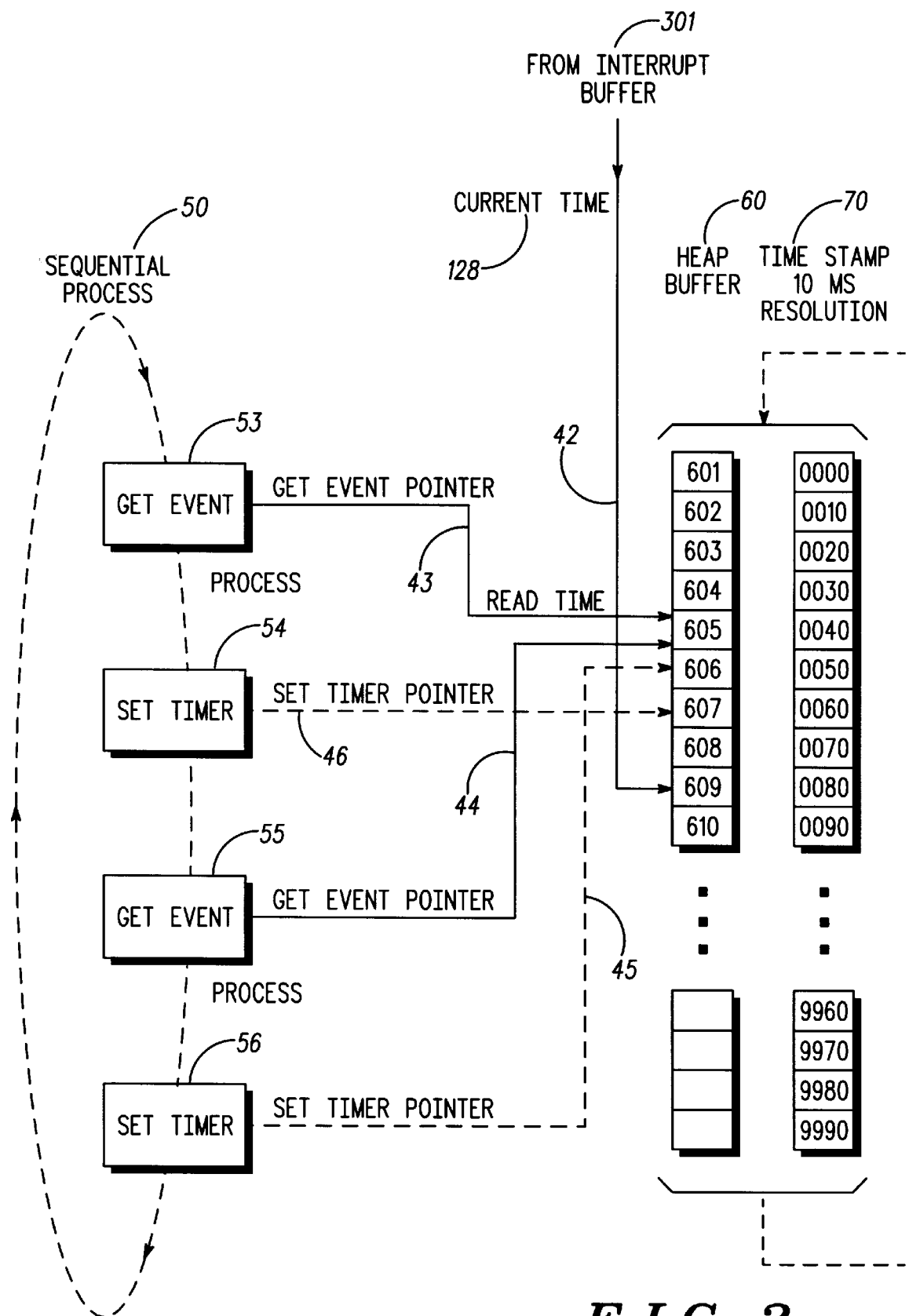
FIG.2 shows the structure of program operations performed by the central processor unit of FIG. 1

Referring to FIG. 2, certain software elements of the CPU 30 are shown. These include an array of pointers 42–46, a sequential process 50, a heap buffer 60 and a series of time-stamp "boxes" 70.

The circular heap buffer 60 comprises a series of boxes 601, 602, 603 etc. The buffer 60 is created in software and resides in RAM storage. Each of these "boxes" can store the information coming from the interrupt buffer 31. The boxes have time-stamps 70, each box has an incremental time-stamp of 10 millisecond steps. Typically the circular buffer 60 comprises 999 boxes i.e. the maximum time delay it can represent its 10 seconds (10 milliseconds×999 boxes). Up to 100 interrupts of data can be stored in each single box.

A number of new control symbols have been added to the ladder diagram language in order to deal with the new functionality. These include a "get event" control 53, 55 and a "set timer" control 54 and 56.

When one of the inputs 21 changes, an interrupt 28 is received at the CPU 30 and the data coming from the input module 11 to 15 plus the exact time coming from the real-time clock 32 is stored in the interrupt buffer 31. The content of the interrupt buffer 31 is stored in one of the boxes according to the real time that the interrupt arrived (in 10 millisecond resolution). The stored data includes the new input's location (module and input number) and the input's new and old values. One event is stored for each change in the input unit.

There are two types of pointers, the first being a pointer that keeps the current time (42) and stores the information coming from the interrupt buffer 31. This pointer moves every 10 milliseconds in a circle of 1,000 steps. In each 10 milliseconds, all the received status events are linked to the current time pointer 42. The second type of pointer is one that keeps track of the boxes that are processed by the sequential processors 50. In FIG. 2, these are pointers 43 and 44. This type of pointer moves more slowly than the current time pointer 42. If the sequential process calls for a delay after the event itself, the process will add the delay time that is needed to the real time (in 54 and 56) that the event was received and it will store the delay status in the box that has the time of the result (45 and 46). The sequential process will pick up the delayed event with the process pointer as if it is a real event.

In order to enable the user to link the "event driven mechanism" to its ladder diagram logic, a number of special ladder diagram variables have been defined:

Event-type—Indicates the type of current processed event.
  0—No current processed event.
  1—Current processed event is a status event.
  2—Current processed event is a timer event.

Inputs-Location—If current processed event is a status event then this is the input's location. Else, if current processed event is a timer event then it is the location of the inputs which have been the trigger for running the timer.

Input-Value—Used for status events only, it is the new value of the input. It is not applicable for timer events.

Timer-Value—Used for timer events only. It is not applicable for status events.

New ladder diagram functions:

New ladder diagram functions are defined to handle the input events information and the timer events.

i. Get-Event—Processes the first input that has been stored and has not yet been processed.

ii. Set-Timer—Starts a timer related to the event which is currently stored in ladder diagram variable indicated above.

iii. Clear-Event—Clears and frees all the event buffers.

iv. Enable-Event—Enables receiving any status event.

v. Disable-Event—Disables receiving any status event.

The functions' actions are detailed below.

As shown in FIG. 2, a heap buffer 60 is provided, to store incoming events (status events and timer events are stored until they are processed). Note that a number of events with the same time-stamp are a "box". The timer event contains the status (input) event that triggered it.

Figure 3:
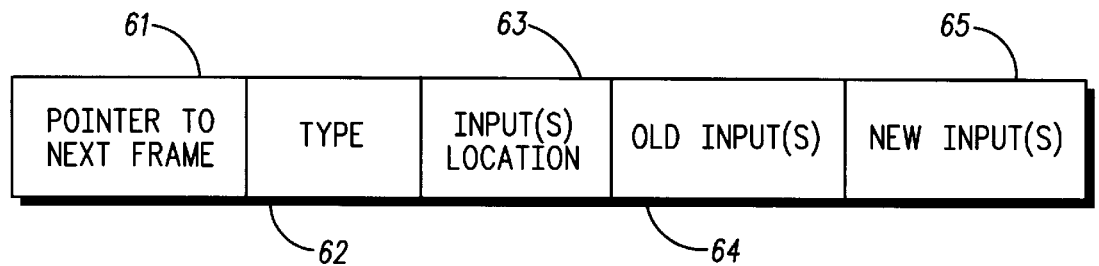
FIG. 3 shows the basic generic structure of the buffers in the heap shown in FIG. 2.

All the buffers in the heap have same basic structure. This is shown in FIG. 3. The buffer structure comprises a pointer to next frame field 61, used for linking the buffers. It has a type field 62, which is a status event buffer or a timer event buffer. An input unit location field 63 is provided, which depends on the implementation. An old input field 64 is provided for an old value of input and a new input field 65 is provided for a new value of input.

If the buffer type is a timer, then the buffer structure is slightly different and is described below with reference to FIG. 5.

The controller supports a default of 100 status events and 50 timer events simultaneously. Thus a default of 150 event buffers is allocated. These numbers can be changed by the user.

Figure 4:
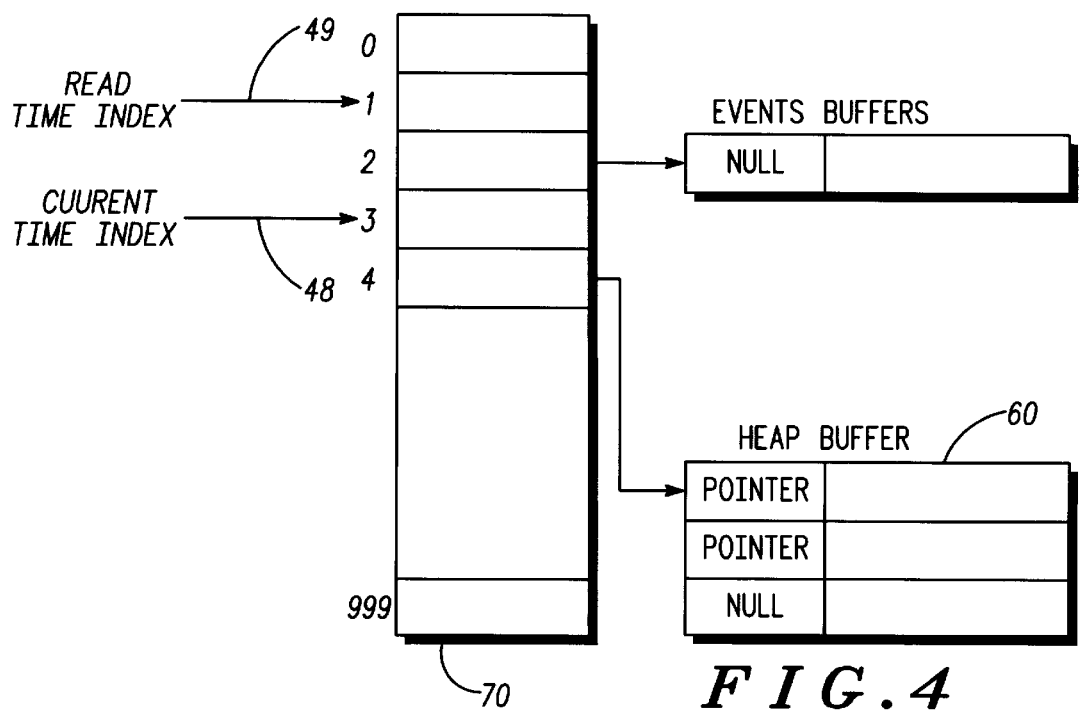
FIG. 4 is an illustration of the operation of pointers in the processor of FIG. 2.

In order to indicate when each event was stored, a time stamp array 70 is provided, as shown in FIG. 4, and is allocated with an entry for each 10 milliseconds of time. Each box in the array 70 points to a linked list of events (heap buffers) stored in the same 10 millisecond interval.

The array length dictates the timer's maximum time, which is the array length ×10 milliseconds. The controller allocates a default of 1000 entries, thus it supports timers up to 10 seconds. Two "pointers" named current-time-idx and read-time-idx 48 and 49 indicate which entries array 70 are of the current 10 millisecond and of the last 10 read millisecond period.

Figure 5:
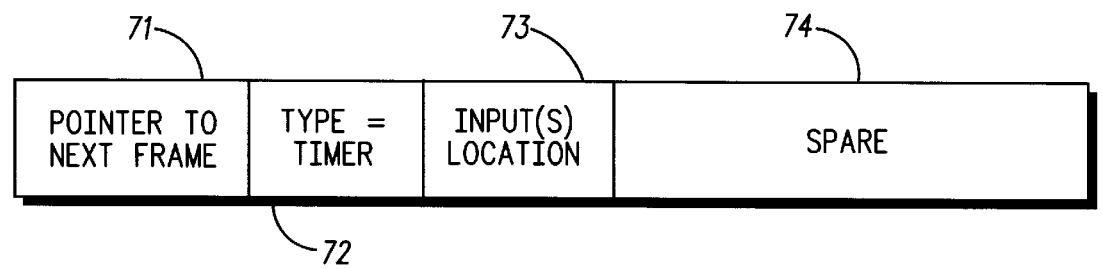
FIG. 5 shows the structure of a timer event frame for the processor of FIG. 2.

Referring now to FIG. 5, the frame structure of a timer event comprises: a field 71 for holding a pointer to the next frame; a type field 72 in which the type indicator indicates that it is a timer frame; an input(s) location field 73 and spare field 74.

A new flag named "Events Overflow" is defined to indicate if events have not been read for 10 seconds. This time interval is equal to the maximum time interval. When this flag is set to TRUE, it is recommended to switch to normal scanning.

There follows some details of the actions of ladder diagram functions.

i. Get-Event

If there is an event buffer to read from those boxes 60 the first buffer in the box which is pointed by read-time-idx is taken out from the box to be processed. If read-time-idx does points to an empty box, the function skips to the next box in array 70 which is not empty and is still before current-time-idx.

If there is any event buffer to process, the first event in the box is removed and its information is placed in the new ladder diagram variables (Event-type, Inputs-Location, Input-Value and Timer-Value). Each call to Get-Event replaces the content of the variables. Both a Timer event and a Status event can be placed in these variables.

The read-time-idx is advanced after all the events in its 10 milliseconds box have been processed ii. Set-Timer This function starts a timer of up to the maximum allowed time with the input's location. No parameter is needed, the timer value is taken from the new variable "Timer-Value" and the location is taken from the new variable "Inputs-Location", both described above. "Timer-Value" should be directly filled while "Inputs-Location" can be filled also by calling the Get-Event function.

The default for timer maximum value is 10 seconds. It is fixed according the formula:

Number of entries in time-idxs array×10 milliseconds.

This value can be changed by the user according to the requirements of its application.

Starting the timer is done by allocating an event buffer (see above), filling it with the timer event information and linking it to the right 10 milliseconds index which represents the time when the timer is going to elapse.

iii. Clear-Event

This function clears all the event buffers' boxes 60. In addition, it clears all the pointers related to the events.

iv. Enable-Event

This function sets a special software flag to TRUE. It enables receiving new inputs into the events queue.

v. Disable-Event

This function clears the same special software flag to FALSE and disables receiving new inputs into the events queue.

The process of advancing the 10 milliseconds pointer includes the steps of: connecting to the 10 milliseconds task each 10 milliseconds (note this can be cut only by an interrupt, thus it stops interrupts); advancing current-time-idx (note if it has reached real-time-idx, i.e. events were not read for 10 seconds, delete the events which are linked to this 10 milliseconds and set the Events Overflow flag); and enabling interrupts.

Writing a status event, under an interrupt, includes: if the timers are enabled and the device is running, allocate a heap buffer, put the interrupt data in the heap buffer, then stop interrupts and link the heap buffer to the current 10 milliseconds box. If event buffers are already linked to this 10 milliseconds box link this buffer as the last one after all the existing ones. Enable interrupts.

Writing a timer event includes: if the data in new variables (Event-Type, Inputs-Location, Input-Value and Timer-Value) are valid and the timer value is permitted, stop interrupts, allocate a heap buffer, and enable interrupt. Fill the heap buffer from the new variables according to the timer event structure. Stop rescheduling, find the 10 milliseconds box to link the timer to. Stop interrupts, link the timer event as the last event in the appropriate 10 milliseconds box. Enable interrupts. Enable rescheduling.

Reading an event with Get-Event function from the events buffer includes: stop rescheduling and find the next 10 milliseconds pointer to read; fill the event data in the new variables (s) (Event-box, Inputs-Location, Input-Value and Timer-Value) according to the heap data and release the heap buffer; enable rescheduling. Note that interrupts are stopped only during the heap releasing.

We claim:

1. A processor arrangement comprising:

a programmer logic controller operating to a ladder diagram process comprising a sequence of instructional steps of a sequential process;

a number of event inputs connected to an interrupt buffer, in turn connected to a real time clock, for recording times of events of signals received on the event inputs and generating interrupts, a cyclical buffer comprising sequential storage locations for storing interrupts and their event times;

event retrieval means for inspecting each location of the cyclical buffer sequentially upon each new instructional step of the sequential process;

wherein the programmer logic controller is arranged to operate on any event inputs stored in the cyclical buffer which are affected by the new step of the sequential process before proceeding to the next step of the sequential process.

2. A processor according to claim 1, wherein the cyclical buffer is formed in random access memory.

3. A method of operating a programmer logic controller operating to a ladder diagram process having a sequence of instructional steps of a sequential process, including instructions involving initiating of timers upon the occurrence of events; comprising the steps of:

receiving event signals at event inputs on the occurrence of events;

recording times of the event signals received on the event inputs and generating interrupts on the occurrence of the events;

storing in a cyclical buffer comprising sequential storage locations, interrupts and their event times;

inspecting each location of the cyclical buffer sequentially upon each new instructional step of the sequential process, and operating on any events stored in the buffer which are affected by the new step of the sequential process before proceeding to the next step of the sequential process.

4. A method according to claim 3, wherein a step of the sequential process is executable to a minimum predetermined time resolution and the times of the event signals are recorded to a resolution greater than the resolution of the steps of the sequential process.

5. A method according to claim 3, wherein the step of operating comprises inserting an indicator into the cyclical buffer in a new location determined by the step and the event, for running a logical equation at a time corresponding to the new location in the buffer.

6. A method according to claim 5, wherein the step of inserting comprises measuring a delay time predetermined by the step in the sequential process and selecting a location in the buffer offset from the storage location corresponding to the predetermined incremental time window by a number of buffer locations corresponding to the delay time.

7. A method according to claim 3, wherein event times are recorded to a predetermined resolution on a micro scale and wherein event inputs are monitored over a time period on a macro scale and when a time-out period is exceeded on the macro scale during which no events are read, the method defaults to a process of receiving events signals at event inputs on the occurrence of events, scanning the event inputs to record events, performing a ladder diagram process having a sequence of instructions and operating on the events recorded and scanned and repeating the process.

* * * * *